April 8, 1930.  D. L. NAEF  1,753,900
FILTERING MINERAL OILS
Filed March 27, 1929

Inventor:
Donald L. Naef

Patented Apr. 8, 1930

1,753,900

UNITED STATES PATENT OFFICE

DONALD L. NAEF, OF WOOD RIVER, ILLINOIS, ASSIGNOR TO STANDARD OIL COMPANY, OF WHITING, INDIANA, A CORPORATION OF INDIANA

FILTERING MINERAL OILS

Application filed March 27, 1929. Serial No. 350,219.

This invention relates to the percolating type of filters for oils in which granular clays, fuller's earth, or other suitable adsorbent material is employed as a filtering and decolorizing medium.

Figure 1:
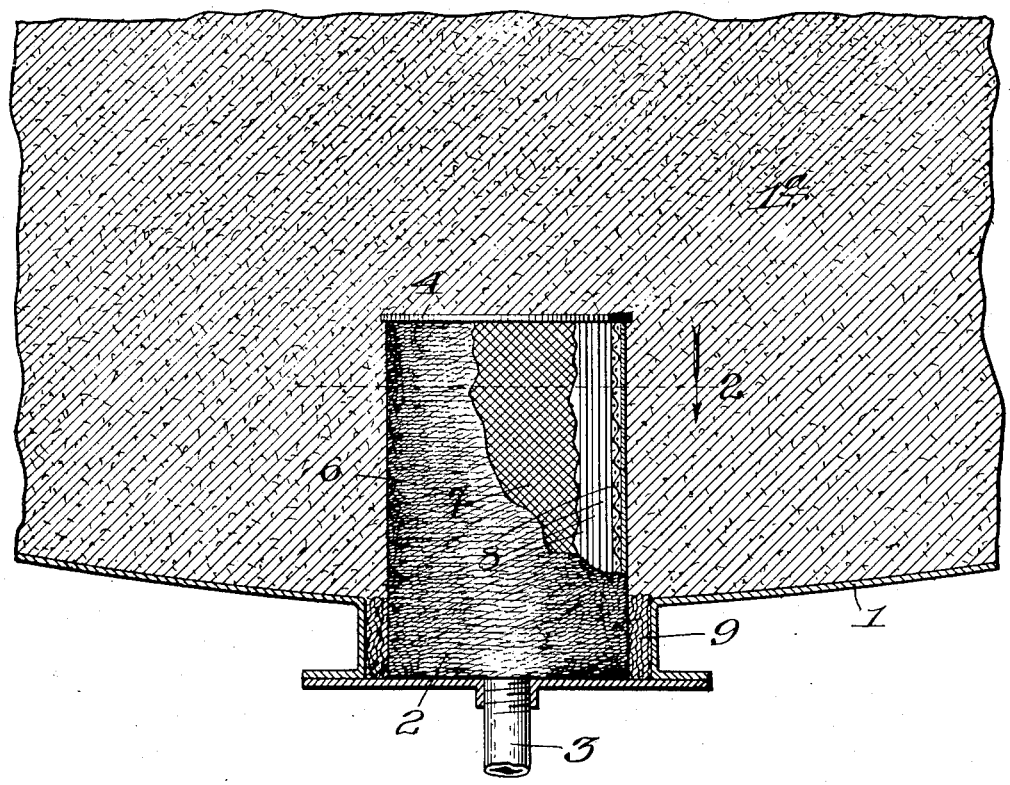
Figure 2:
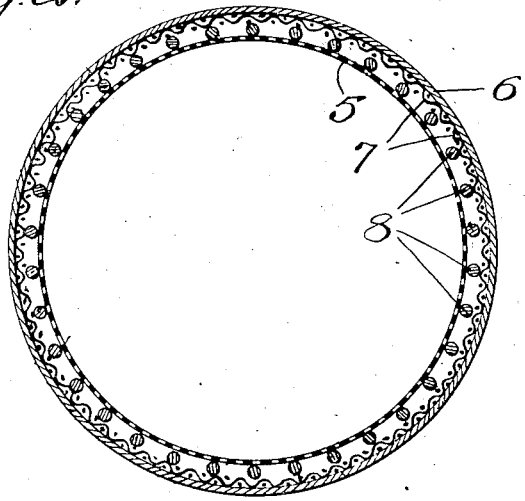

The invention will be clearly understood from the following description of an apparatus embodying the same, in which:

Figure 1 illustrates a broken section of the bottom of a filter tank constructed in accordance with the invention; and Fig. 2 is an enlarged detail section through the device, taken on line 2 of Fig. 1.

In the drawings, 1 designates an ordinary filter tank adapted to receive a filtering medium 1ª, for example, fuller's earth. The bottom portion of the tank is slightly conical in shape and provided at the lowermost point or apex of the cone with a central depressed portion or an outlet well 2, generally of annular section. An outlet pipe 3 is tapped into the bottom of the outlet well and serves to conduct away the filtrate.

In the outlet well is set a cylindrical structure consisting of a top plate 4 and a perforated shell 5 depending from the top plate into the outlet well 2. The perforated side walls are provided with a filter medium 6 which may be made of canvas or the like. A coarse wire mesh or screen 7 is interposed between the shell 5 and the filter medium 6, and a peripheral series of reinforcing spacer rods 8 is interposed between the supporting screen 7 and the side walls 5. Packing material, such as cotton waste 9 is interposed between the lower side walls of the outlet device and the side walls of the outlet well 2.

Before filling the filter with clay or other adsorbent material, the filter medium 6 may be sprayed or painted with an oil suspension of filter aid or other finely divided inert material, thereby preventing the interstices of the filter medium from becoming clogged and reducing the rate of filtration.

In an oil filter which is approximately fourteen feet in diameter, and which is adapted to receive a sixteen foot layer of clay, for example, it has been found that an outlet device of this character, twenty inches in diameter and thirty inches high, will successfully accommodate the outgoing filtrate.

In prior operations it has been customary to cover the entire conical flow of the tank with a fabric filter medium, which was difficult to apply and to pack properly against the escape of the clay or other adsorbent material used. Furthermore, large areas of the filter medium were required. In operating in accordance with the present invention, the device is readily installed, not easily damaged, and requires but little skill, time or filter material in placing it in condition for operation.

I claim:

1. The combination with a mineral oil filter tank of the percolating type, adapted to contain granular adsorbent material and provided with a depressed outlet well at the lowest point in the bottom thereof, of a filter medium support positioned in said well and extending vertically above the bottom of the tank and serving to prevent passage of the adsorbent material into the outgoing filtered oil, said outlet device comprising a perforated shell, a fabric covering for said shell, and a supporting screen interposed between said shell and said covering, and packing material in the space between said support and the inner wall of the well.

2. The combination with a mineral oil filter tank of the percolator type adapted to contain granular adsorbent material and provided with a depressed outlet well at the lowest point in the bottom thereof, of a filter device positioned in said well and extending vertically above the bottom of the tank and serving to prevent passage of the adsorbent material into the outgoing filtered oil, said filter device comprising a perforated cylindrical shell, a fabric covering for said shell, a supporting screen interposed between said shell and said covering, and screen-supporting means interposed between said screen and said shell, and packing material in the space between said filter device and the inner wall of the well.

3. The combination with a mineral oil filter tank of the percolator type adapted to contain granular adsorbent material and provided with a depressed outlet well at the lowest point thereof, of a cylindrical perforated filter medium support seated in said well and extending vertically above the bottom of the tank, said support being externally covered with a filter medium, and packing in said outlet well surrounding the base of said support.

DONALD L. NAEF.